United States Patent
Negishi et al.

(10) Patent No.: US 9,873,162 B2
(45) Date of Patent: Jan. 23, 2018

(54) STRAIGHTENING DEVICE FOR WELDING WIRE

(71) Applicant: KOBE STEEL, LTD., Kobe-shi (JP)

(72) Inventors: Koji Negishi, Fujisawa (JP); Takeshi Azuma, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/104,401

(22) PCT Filed: Nov. 27, 2014

(86) PCT No.: PCT/JP2014/081395
§ 371 (c)(1),
(2) Date: Jun. 14, 2016

(87) PCT Pub. No.: WO2015/098422
PCT Pub. Date: Jul. 2, 2015

(65) Prior Publication Data
US 2016/0311048 A1   Oct. 27, 2016

(30) Foreign Application Priority Data
Dec. 27, 2013   (JP) .................................. 2013-271680

(51) Int. Cl.
*B23K 9/12*   (2006.01)
*B23K 9/32*   (2006.01)
(Continued)

(52) U.S. Cl.
CPC .................. *B23K 9/12* (2013.01); *B21D 3/05* (2013.01); *B21F 1/02* (2013.01); *B23K 9/173* (2013.01); *B23K 9/327* (2013.01)

(58) Field of Classification Search
CPC .... B21D 3/05; B21F 1/02; B23K 9/12; B23K 9/173; B23K 9/327
See application file for complete search history.

(56) References Cited

U.S. PATENT DOCUMENTS 2,084,746 A       6/1937   Roberts
2006/0266794 A1   11/2006  Melfi et al.

FOREIGN PATENT DOCUMENTS

CN   203209583 U   9/2013
DE   1 229 124 B   11/1966
(Continued)

OTHER PUBLICATIONS

Machine translation of JP 2013-212511, Tojo et al., pp. 1-8, translated on Feb. 2, 2017.*
(Continued)

*Primary Examiner* — Teresa M Ekiert
(74) *Attorney, Agent, or Firm* — Oblon, McClelland, Maier & Neustadt, L.L.P.

(57) ABSTRACT

A straightening device for welding wire is provided with two sets of roll groups, having a plurality of straightening rolls with which bends in a welding wire are straightened by passing the welding wire through the two sets of roll groups. The plurality of straightening rolls configuring the roll groups, are arranged at a predetermined arrangement interval along a passing direction of the welding wire in such a way as to face with each other across a straightening path along which the welding wire passes, and the two sets of roll groups, are arranged so that the directions in which they face across the straightening path are different from each other. By configuring the straightening rolls by small-diameter rollers, adverse effects on the welding wire are suppressed, and the welding wire is straightened finely.

9 Claims, 4 Drawing Sheets

(51) Int. Cl.
    *B23K 9/173*      (2006.01)
    *B21D 3/05*      (2006.01)
    *B21F 1/02*      (2006.01)

(56) References Cited

FOREIGN PATENT DOCUMENTS

| | | |
|---|---|---|
| JP | 11-277169 A | 10/1999 |
| JP | 2001-30077 A | 2/2001 |
| JP | 3578586 B2 | 10/2004 |
| JP | 2011-194443 A | 10/2011 |
| JP | 2013-212511 A | 10/2013 |
| KR | 20-2008-0002263 U | 7/2008 |
| KR | 10-2009-0098587 A | 9/2009 |

OTHER PUBLICATIONS

International Search Report dated Feb. 17, 2015, in PCT/JP2014/081395 filed Nov. 27. 2014.

International Preliminary Report on Patentability and Written Opinion issued Jul. 7, 2016, in PCT/JP2014/081395 (with English translation).

Extended European Searth Report dated Aug. 2, 2017 in corresponding European Patent Application No. 14673540.0, citing documents AA and AO therein (8 pages).

\* cited by examiner

STRAIGHTENING DEVICE FOR WELDING WIRE

CROSS-REFERENCE TO RELATED APPLICATIONS

This is a national phase application in the United States of International Patent Application No. PCT/JP2014/081395 with an international filing date of Nov. 27 2014, which claims priority of Japanese Patent Application No. 2013-271680 filed on Dec. 27, 2013 the contents of which are incorporated herein by reference.

TECHNICAL FIELD

The present invention relates to a straightening device for welding wire for straightening bends or twists of a welding wire.

BACKGROUND ART

In metal welding such as arc welding, a welding wire fed to a welding torch is melted by arc heat to be consumed. Accordingly, the welding wire has to be continuously fed to the welding torch in response to a consumption amount in the welding torch.

This welding wire is drawn from a state of being wound around a spool or a state of being housed in a pack, to be fed to the welding torch. The drawn welding wire has a curling habit, and is bent or twisted. The welding wire thus having the curling habit is linearly straightened by a straightening device for straightening a curling habit, and thereafter is fed to the welding torch.

JP 2011-194443 A discloses a straightener for straightening bends or twists of a welding wire. The straightener described in JP 2011-194443 A includes three or more straightening units. In each of the straightening units, four or more rolls are arranged in zigzag so as to face with each other across a wire path. The three or more straightening units are arranged in series in the wire feeding direction. Bend in a plastic deformation region is applied to a wire by a first roll group on a wire entrance side, configured from first, second and third rolls of each straightening unit. A plastic deformation amount applied to the wire by a second roll group and subsequent groups configured from second, third, and fourth rolls is gradually lowered, and bend in an elastically deformation region is applied to the wire by a final roll group on an exit side. The three or more straightening units are arranged so that a roller axial direction has an angle difference distributed in a range of 90 degrees or more around a wire axis.

SUMMARY OF THE INVENTION

Problems to be Solved by the Invention

In the conventional straightener disclosed in JP 2011-194443 A, the pressing depths of the rolls in the straightening unit tend to be increased in order to satisfactorily straighten the welding wire. However, when the pressing depth of each roll (in other words, a pressing amount of the welding wire by each roll) is increased, a problem that the welding wire is damaged due to the increase of this pressing amount, and particularly, a problem that a contained flux leaks in a flux cored wire occurs. Additionally, when the pressing amount of each roll is large, force acts on the welding wire in the direction deviated from a groove of each roll, and therefore a problem that the welding wire moves away in the groove of the roll to be twisted also occurs.

Furthermore, when the contact length between the welding wire and each roll increases, a contact area in which friction is generated also increases, and therefore a problem that plating applied on the surface of the welding wire comes off, or applied lubricant or oil is removed occurs.

Therefore, the present invention has been made in view of the above problems, and an object of the present invention is to provide a straightening device for welding wire capable of suppressing a harmful influence on a welding wire, and satisfactorily straightening the welding wire.

Methods for Solving the Problem

In order to achieve the object, the present invention applies the following technical solutions.

A straightening device for welding wire according to the present invention comprising, two sets of roll groups each configured by a plurality of straightening rolls, wherein the straightening device allows a welding wire to pass through the two sets of roll groups to straighten bends of the welding wire, wherein the plurality of straightening rolls configuring the roll groups are arranged at a predetermined arrangement interval along a passing direction of the welding wire so as to face with each other across a straightening path along which the welding wire passes, wherein the two sets of roll groups are arranged so that the directions in which they face across the straightening path are different from each other, and wherein the straightening rolls are configured by small-diameter rolls.

In this arrange, it is preferable that each of the roll groups is configured to include the straightening roll that satisfies the following range of a ratio of a roll diameter of the straightening roll to a wire diameter of the welding wire.

$$4 \leq \frac{r}{d} \leq 9$$

r: roll radius of straightening roll
d: wire diameter of welding wire.

Further, it is preferable that each of the roll groups is configured to include the straightening roll that satisfies the following range of a ratio of a roll diameter of the straightening roll to a wire diameter of the welding wire.

$$4 \leq \frac{r}{d} \leq 6$$

r: roll radius of straightening roll
d: wire diameter of welding wire.

Further, it is preferable that each of the roll groups is configured to include the straightening rolls arranged so as to satisfy the following ratio of the roll diameter to an arrangement interval between the straightening rolls.

$$0.5 \leq \frac{r}{L} \leq 0.7$$

r: roll radius of straightening roll
L: arrangement interval between straightening rolls.

Further, it is preferable that each of the roll groups is configured by the five straightening rolls.

Furthermore, it is preferable that each of the roll groups is a non-adjustable type that does not allow change of arrangement positions of the straightening rolls configuring the roll group.

Effect of the Invention

According to a straightening device for welding wire according to the present invention, it is possible to suppress a harmful influence on a welding wire, and satisfactorily straighten the welding wire.

MODE FOR CARRYING OUT THE INVENTION

Hereinafter, an embodiment of the present invention will be described with reference to the drawings. The embodiment described below is an embodied example of the present invention, and a configuration of the present invention is not limited to only the embodied example. Accordingly, a technical range of the present invention is not limited only to the disclosed contents of this embodiment.

Figure 1:
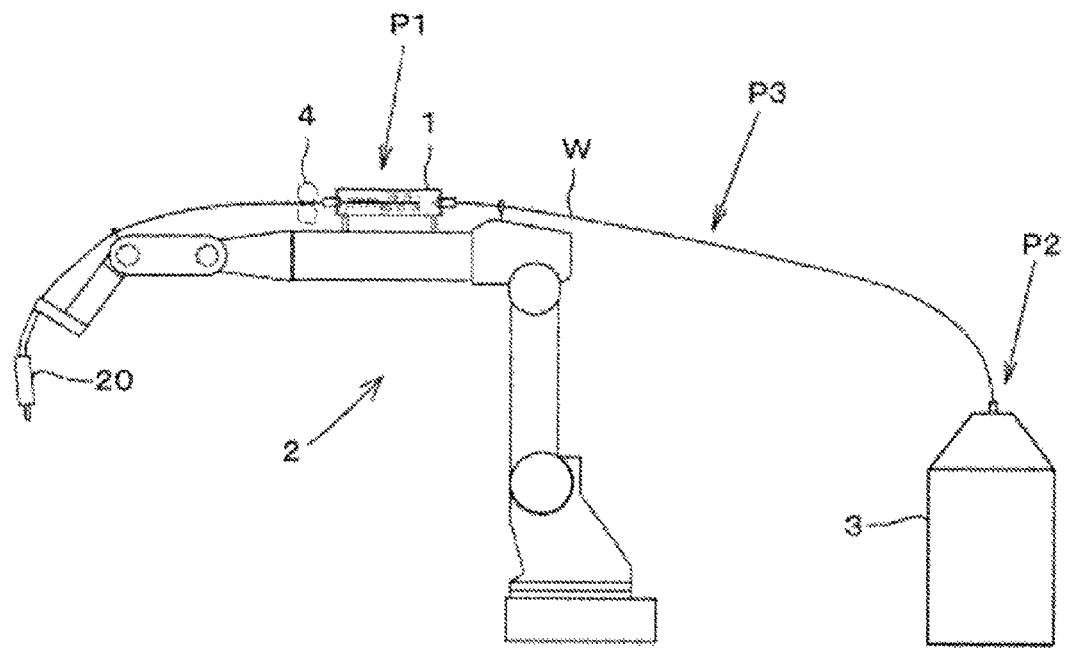
FIG. 1 is a schematic diagram for schematically illustrating a process of feeding a welding wire drawn from a pack to a welding torch of a welding robot.

Before a straightening device 1 for welding wire according to the embodiment of the present invention is described, a process of straightening a wire W for welding fed to a welding torch 20 will be described with reference to FIG. 1. FIG. 1 is a schematic diagram for schematically illustrating a process of allowing the welding wire W drawn from a pack 3 to pass through the straightening device 1 for welding wire according to this embodiment to feed the welding wire W to the welding torch 20 of a welding robot 2.

With reference to FIG. 1, the wire W for welding such as a solid wire that is solid, and a wrapped wire and a seamless wire, each of which is a flux cored wire into which a flux is inserted into an hollow part of the inside, is housed in the pack 3 in a state of being wound around in a circular manner, for example, and is drawn from an upper end of the pack 3. The wire W for welding drawn from the pack 3 is fed to the welding torch 20 provided at, for example, an arm distal end of the welding robot 2, while passing through the straightening device 1 for welding wire according to this embodiment before the welding torch 20.

The wire W for welding passes through the straightening device 1 for welding wire, so that a curling habit or twist due to housing inside the pack 3 is fixed, and the welding wire W becomes almost linear without the curling habit or the twist. The linear welding wire W is fed to the welding torch 20 that performs arc welding by a feeder 4, and is melted at a distal end of the welding torch 20 to be used as a welding material.

At this time, when the curling habit or the twist remains in the welding wire W, the welding wire W is fed in a state of being bent to the distal end of the welding torch 20, and therefore a distal end of the welding wire W is deviated from a position of the distal end of the welding torch 20, and so-called "wire run-out" occurs. When this "wire run-out" occurs, the welding wire W cannot be melted at a correct welding position, and it becomes difficult to implement high welding quality. Therefore, in order to suppress the "wire run-out" and implement high welding quality, the straightening device 1 for welding wire that straightens the welding wire W so that the welding wire W becomes linear plays an extremely important role.

In FIG. 1, the straightening device 1 for welding wire (hereinafter, referred to as the straightening device 1) is provided at a position P1 on a robot arm of the welding robot 2, but may be provided at a position P2 right after the welding wire W is drawn from the pack 3, or may be provided at a position P3 between the pack and the welding robot. The straightening device 1 installed at any position has desirably a small size in order to hardly restrict the size or the shape of an installation space. Particularly, in a case where the straightening device 1 is provided on the robot arm such as the position P1, the straightening device 1 has desirably particularly a small size so as not to restrict a movable range of the welding robot 2.

Regardless of the solid wire or the flux cored wire, the pressing amount of the welding wire W in the straightening device 1 is desirably small in order to avoid damage of the welding wire W. Furthermore, lubricant or oil is often applied to a surface of the wire W for welding, and plating is applied to the surface depending on intended use. Accordingly, the straightening device 1 desirably has a configuration in which not only the pressing amount is small but also the straightening device 1 is minimally brought into contact with the surface of the wire W for welding so that the applied lubricant or oil is not removed, and plating is not damaged in a process of straightening the wire W for welding.

Hereinafter, a configuration of the straightening device 1 will be described with reference to FIG. 2A and FIG. 2B.

Figure 2A:
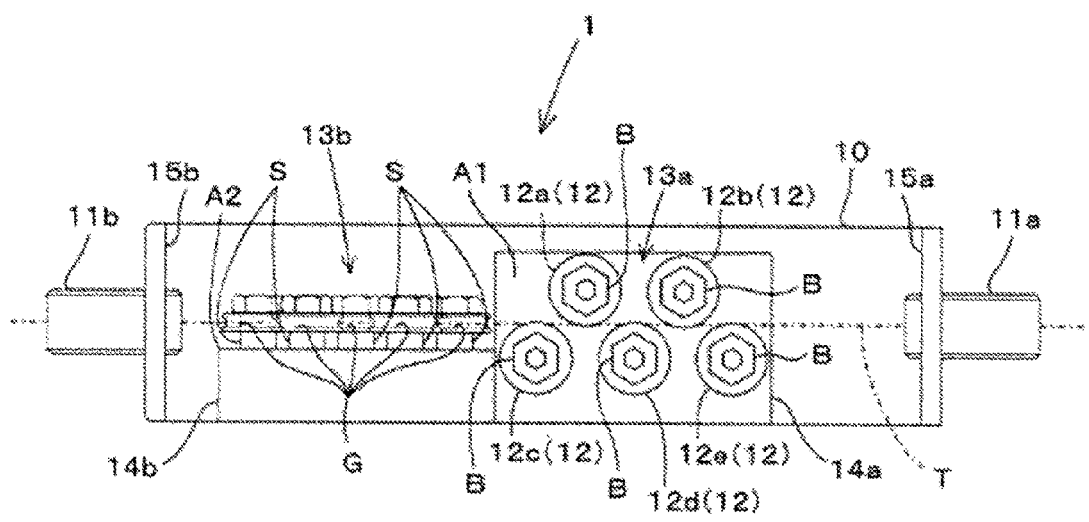
FIG. 2A is a front view of a straightening device for welding wire according to an embodiment of the present invention.
Figure 2B:
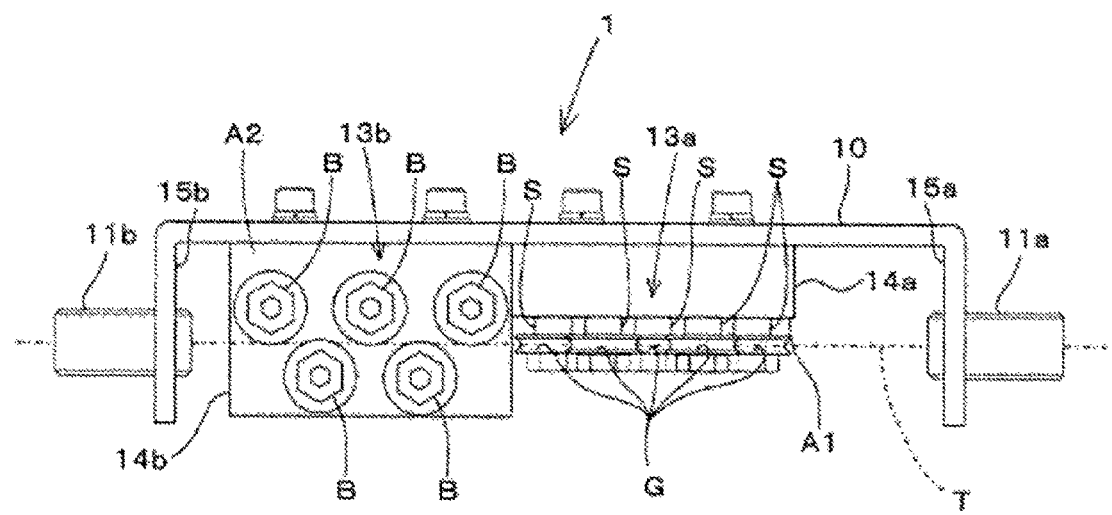
FIG. 2B is a top view of the straightening device for welding wire according to the embodiment of the present invention.

FIG. 2A is a front view of the straightening device 1, and FIG. 2B is a top view showing a state where the straightening device 1 shown in FIG. 2A is viewed from the above when directed to the drawing plane (that is, a state of the upper side of the straightening device 1).

With reference to FIG. 2A, the straightening device 1 includes a frame 10, two guide pipes (guide bodies) 11a, 11b provided in both ends of the frame 10, a first roll group 13a and a second roll group 13b that are two sets of roll groups configured by a plurality of straightening rolls 12, and a first pedestal 14a and a second pedestal 14b that are two pedestals that support the first roll group 13a and a second roll group 13b, respectively, and are fixed to the frame 10. This straightening device 1 allows the welding wire W to pass through the first roll group 13a and the second roll group 13b to straighten bents of the welding wire W.

The frame 10 is a plate-like member having a rectangular flat plate surface, and has two flat-plate-like substantially congruent wall plates 15a, 15b provided almost perpendicular to the flat plate surface, at both ends along the longitudinal direction of the flat plate surface. The two wall plates 15a, 15b are provided so as to be almost perpendicular to the flat plate surface toward the same direction, and face each other to be almost parallel to each other.

The guide pipes (guide bodies) 11a, 11b are pipe bodies, and are members having through holes along the longitudinal directions of the pipe bodies. The through holes of the guide pipes 11a, 11b are holes having sufficiently large diameters compared to the wire diameter (wire diameter d) of the welding wire W.

As shown in FIG. 2A, the guide pipes 11a, 11b are held by the wall plates 15a, 15b while penetrating the wall plates 15a, 15b so that the axial centers of the through holes almost coincide with each other. The guide pipe 11a is held by the wall plate 15a, and the guide pipe 11b is held by the wall plate 15b.

The welding wire W that passes through the through hole of the first guide pipe 11a from the outside of the frame 10 (from the right side with respect to the drawing plane of FIG. 2A, for example) almost linearly passes inside of the frame 10 toward the second guide pipe 11b, and passes through the through hole of the second guide pipe 11b to go out to the outside of the frame 10. At this time, a path through which the welding wire W passes inside the frame 10 is a straight line shown by the one dot chain lines in FIG. 2A and FIG. 2B, and is referred to as a straightening path T.

Each of the first roll group 13a and the second roll group 13b is configured by the five straightening rolls 12 described later, and the five straightening rolls 12 are arranged at predetermined arrangement intervals along the passing direction of the welding wire W so as to face each other across the straightening path T. Before the configurations of the first roll group 13a and the second roll group 13b are described, the configurations of the straightening rolls 12 will be described in detail.

Each of the straightening rolls 12 has a disk shape having a larger thickness than the wire diameter d of the welding wire W, and is a member that is rotatable around the axial center of the disk shape.

In this embodiment, the straightening roll 12 is configured by a bearing such as a rolling bearing having an inner ring (inner race), an outer ring (outer race), and a rolling element. Accordingly, the straightening roll 12 is configured by only the member configuring the bearing having the inner ring (inner race), the outer ring (outer race), and the rolling element, and the thickness of the outer race along the rotation axial center of the straightening roll 12 is larger than the wire diameter d of the welding wire. On an outer peripheral surface of the outer race of the straightening roll 12, a groove is formed along the outer race, that is, over an entire periphery along the rotation direction of the outer race. Hereinafter, this groove is referred to as a straightening groove G.

The straightening groove G may have any shape, for example, an arc-shape, a U-shape, a V-shape, or the like. An upper end of the straightening groove G with respect to a groove bottom of the groove G is located sufficiently above a position at which the welding wire W contacts with a wall surface of the straightening groove G, and the opening width of the straightening groove G is preferably slightly larger than the wire diameter d of the welding wire W. When the opening width of the straightening groove G is formed to be slightly larger than the wire diameter d, the upper end of the straightening groove G can serve as a pressing part that suppresses excessive swing or vibration of the welding wire W inside the straightening groove G.

Compared to the straightening roll 12 having the above configuration, a conventional straightening roll is configured by a two members including a ring and a bearing by assembling an annular member (ring) provided with a straightening groove to an outer race of the bearing to integrate the two members. Accordingly, in the conventional straightening roll, the straightening roll not only tends to be increased in size, but also has a possibility that the assembly position of the ring to the outer race is deviated with use.

When a simple configuration, in which a straightening roll is configured by only a member configuring a bearing, and a straightening groove G is directly formed on an outer race, like the straightening roll 12 according to this embodiment is employed, the straightening roll 12 can be downsized, and necessity for producing a conventional ring, and time and labor necessary for securing and maintaining assembly accuracy of the ring are also eliminated.

With reference to FIG. 2A, the first roll group 13a and the second roll group 13b will be described.

First, by use of the above five straightening rolls 12, the first roll group 13a is configured by arranging the five straightening rolls 12 so that the formation direction of the straightening groove G of each of the straightening rolls 12 (rotation direction of each straightening roll 12) is located along the formation direction of the straightening path T. The arrangement of the five straightening rolls 12 will be hereinafter described.

The five straightening rolls 12 of the first roll group 13a are arranged so that, in the vertical direction with respect to the drawing plane of FIG. 2A, the two straightening rolls 12 (12a, 12b) are arranged above the straightening path T shown by the one dot chain line, and the three straightening rolls 12 (12c, 12d, 12e) are arranged below the straightening path T. The two upper straightening rolls 12 are arranged at a predetermined axial center interval 2L along the straightening path T, and the three lower straightening rolls 12 are arranged in a similar manner. Additionally, the upper straightening rolls 12 and the lower straightening rolls 12c, at the straightening grooves G, face with the straightening path T sandwiched from the direct opposite directions.

At this time, each of the five straightening rolls 12 is arranged so as to face the straightening rolls 12 across the straightening path T, not in the direction perpendicular to the straightening path T, but in the direction oblique to the straightening path T. That is, the two upper straightening rolls 12 (12a, 12b) are arranged at positions corresponding to almost the centers of the axial center intervals 2L of the adjacent lower straightening rolls 12 (12c, 12d, 12e) so as to face the straightening path T. In other words, the three lower straightening rolls 12 (12c, 12d, 12e) are arranged so that the two upper straightening rolls 12 (12a, 12b) face the straightening path at positions corresponding to almost the centers of the axial center intervals 2L of the adjacent straightening rolls 12 (12c, 12d, 12e).

The first roll group 13a in which the five straightening rolls 12 are arranged as described above is supported by the first pedestal 14a. The first pedestal 14a is a rectangular parallelepiped member formed of, for example, the same material as that of the frame 10, and has a side surface that is in contact with the frame 10 to be fixed to the frame 10. In the first pedestal 14a, the first roll group 13a is supported on a support surface A1 (that is, a side surface parallel to the surface in contact with the frame 10) that is a side surface opposite to the surface in contact with the frame 10.

The respective straightening rolls 12 of the first roll group 13a are supported on the support surface A1 through bolts B that penetrate the inner rings (inner races) and are screwed into bolt holes previously provided in the support surface A1 of the one pedestal 14a. At this time, each of the straightening rolls 12 may be supported on the support surface A1 with a spacer S for holding a constant distance from the support surface A1 interposed between the straightening roll and the support surface A1. In a case where the spacers S are used, the inner races of the straightening rolls 12 are sandwiched by heads of the bolts B screwed into the bolt holes of the support surface A1, and the spacers S in contact with the support surface A1, and therefore the respective straightening rolls 12 are supported on support surface A1 of the first pedestal 14a.

When the respective straightening rolls 12 are held by use of the spacers S having suitable lengths, the first roll group 13a can be arranged at the above-described position with respect to the straightening path T by fixing of the first pedestal 14a to the frame 10.

FIG. 2B is a diagram showing a state where the straightening device 1 shown in FIG. 2A is viewed from above with respect to the drawing plane. As shown in FIG. 2B, the respective straightening rolls 12 of the first roll group 13a are arranged so that the straightening grooves G almost overlap with the straightening path T.

As described above, the respective straightening rolls 12 configuring the first roll group 13a are fixed to the predetermined positions with respect to the first pedestal 14a, and the first pedestal 14a is fixed to the predetermined position of the frame 10, and therefore the arrangement positions of the respective straightening rolls 12 configuring the first roll group 13a are fixed inside the frame 10. Accordingly, it can be said that the first roll group 13a is a non-adjustable type that does not allow change of the arrangement positions of the respective straightening rolls 12 inside the frame 10.

The second roll group 13b is configured by five straightening rolls 12 in a similar manner to the first roll group 13a, and is supported by a support surface A2 of the second pedestal 14b having almost the same configuration as the first pedestal 14a. That is, the second roll group 13b has almost the same configuration as the first roll group 13a, and is a non-adjustable type similar to the first roll group 13a. The respective straightening rolls 12 configuring the second roll group 13b, at the straightening grooves G, face with each other across the straightening path T.

Different points of the second roll group 13b from the first roll group 13a are as follows. That is, the second roll group 13b is arranged so that the directions in which the respective straightening rolls 12 of the second roll group 13b face with other across the straightening path T (facing directions) are different from the facing directions of the respective straightening rolls 12 of the first roll group 13a. More specifically, the facing directions of the respective straightening rolls 12 of the second roll group 13b are the directions rotated by about 90 with respect to the facing directions of the respective straightening rolls 12 of the first roll group 13a.

In order to implement the placement of the second roll group 13b, the second pedestal 14b that supports the second roll group 13b is in contact with the frame 10 by a side surface adjacent to the support surface A2 that supports the second roll group 13b, and is fixed to the frame 10 so as to be adjacent to the first roll group 13a.

As shown in FIG. 2B, the respective straightening rolls 12 of the second roll group 13b face with each other in the direction oblique to the straightening path T and across the straightening path T. Additionally, as shown in FIG. 2A, the respective straightening rolls 12 are arranged so that the straightening grooves G almost overlap with the straightening path T. That is, the arrangement of the respective straightening rolls 12 with respect to the straightening path T in the first roll group 13a, and the arrangement of the respective straightening rolls 12 with respect to the straightening path T in the second roll group 13b are almost the same.

Figure 3:
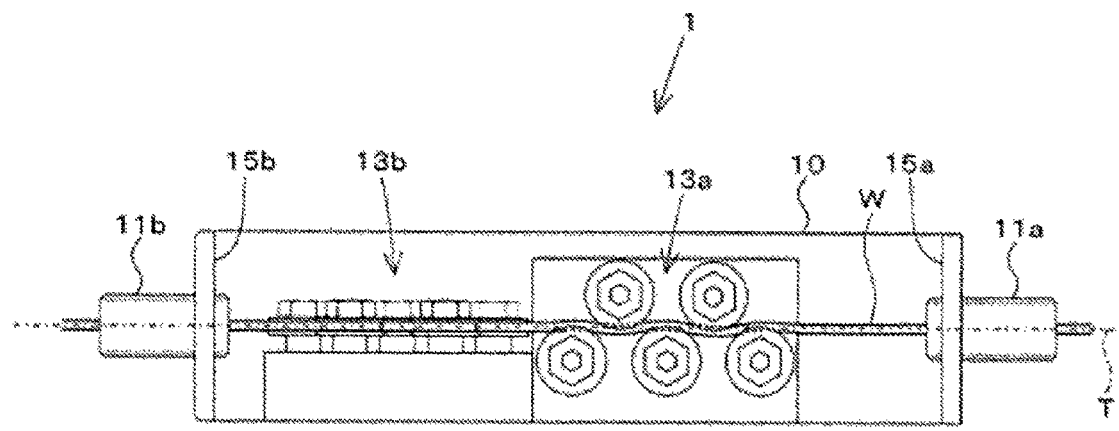
FIG. 3 is a front view of the straightening device for welding wire in a state of allowing the welding wire to pass through the straightening device for welding wire according to the embodiment.
Figure 4:
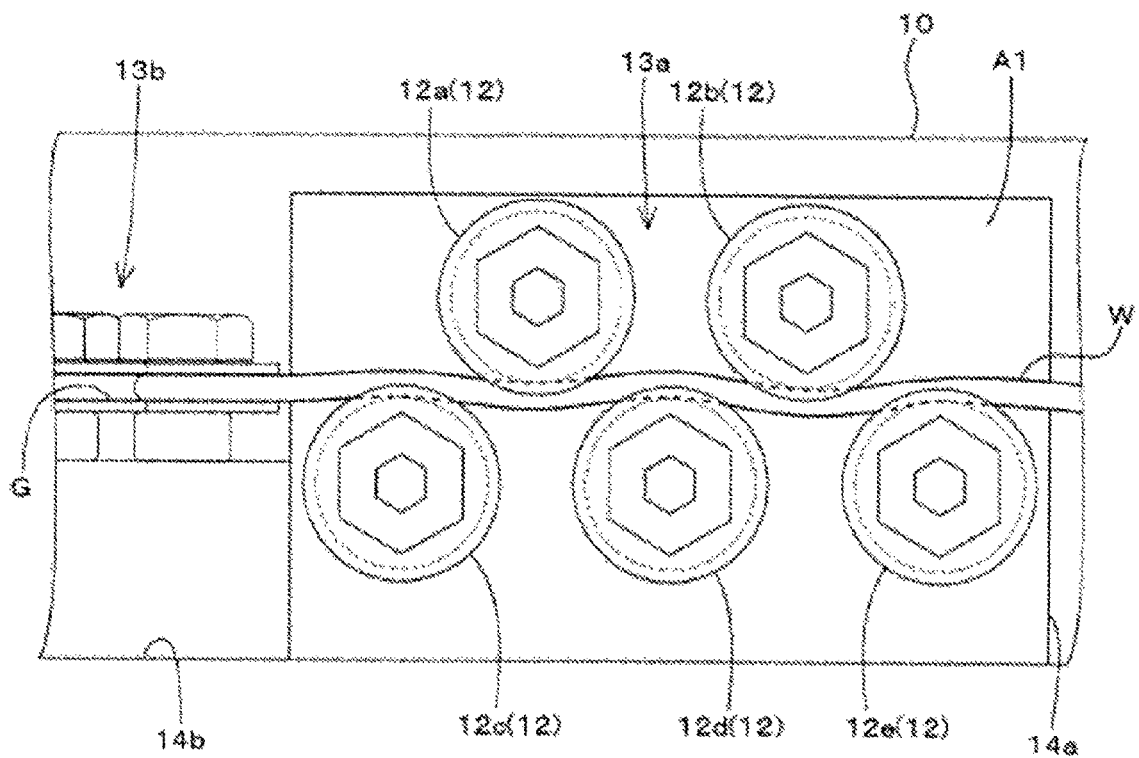
FIG. 4 is an enlarged view enlarging and showing a first roll group of the straightening device for welding wire according to the embodiment.

With reference to FIG. 3 and FIG. 4, a relation between the above straightening device 1 including the first roll group 13a and the second roll group 13b, and the welding wire W that passes through the straightening path T will be described. FIG. 3 is a front view of the straightening device for welding wire in a state of allowing the welding wire W to pass through the straightening device 1 shown in FIG. 2A. FIG. 4 is an enlarged view enlarging and showing the first roll group 13a of the straightening device 1.

As shown in FIG. 3, for example, the welding wire W that passes through the through hole of the first guide pipe 11a from the outside of the frame 10 passes through the first roll group 13a and the second roll group 13b along the straightening path T, almost linearly passes inside of the frame 10 toward the second guide pipe 11b, and passes through the through hole of the second guide pipe 11b to go out to the outside of the frame 10. The welding wire W that passes through the first roll group 13a and the second roll group 13b alternately receives pressing force in the right opposite directions from the five straightening rolls 12 of each of the first roll group 13a and the second roll group 13b.

When the enlarged view of the first roll group 13a shown in FIG. 4 is referred, it is found that the welding wire W sequentially comes into contact with the five straightening rolls 12 of the first roll group 13a, so that the welding wire W alternately receives pressing force from above and pressing force from below with respect to the drawing plane of FIG. 4 to be slightly bent upward and downward. Furthermore, in the second roll group 13b, the welding wire W alternately receives pressing force from the directions different from the directions of the pressing force when receiving pressing force in the first roll group 13a by about 90°, that is, receives pressing force from right and pressing force from left with respect to the passing direction of the welding wire W. Then the welding wire W is slightly curved to right and left.

Thus, the welding wire W alternately curved upward and downward or curved right and left by passing through the first roll group 13a and the second roll group 13b becomes almost linear when the welding wire W passes through the second roll group 13b, and is drawn to the outside of the straightening device 1. In the description of the above first roll group 13a and second roll group 13b, although the arrangement of the respective straightening rolls 12 in the direction along the straightening path T (positional relation) is mainly described, the facing directions of the respective straightening rolls 12, that is, the positional relation in the facing directions of the respective straightening rolls 12 with respect to the straightening path T are not described in detail. Hereinafter, the configurations of the first roll group 13a and the second roll group 13b including the positional relation in the facing directions of the respective straightening rolls 12 will be further described in detail.

Figure 5:
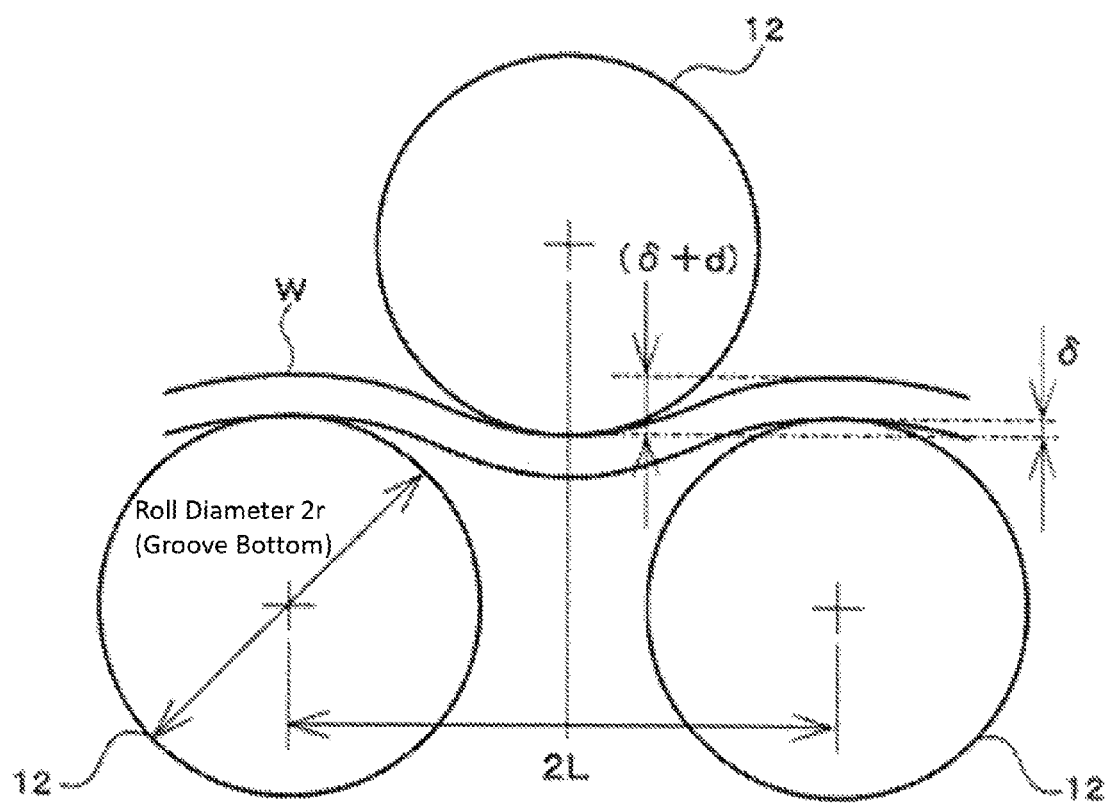
FIG. 5 is a conceptual diagram for conceptually showing a relation between arrangement of straightening rolls and a pressing amount of a welding wire.

With reference to FIG. 5, the configurations of the first roll group 13a and the second roll group 13b including the arrangement in the facing directions of the respective straightening rolls 12 (positional relation) will be described in detail. FIG. 5 is a conceptual diagram for conceptually showing a relation between the arrangement of straightening rolls 12 in the first roll group 13a and the second roll group 13b and the pressing amount of the welding wire W.

As shown in FIG. 5, the positional relation in the facing directions of the respective straightening rolls 12 that are the configurations of the first roll group 13a and the second roll group 13b are described by using four parameters, namely, a distance 2L between axes of the adjacent straightening rolls 12, a roll diameter 2r of each straightening roll 12, the wire diameter d of the welding wire W, and an engaging amount δ of the straightening rolls 12. The configurations of the first roll group 13a and the second roll group 13b, described in the following, that is, selection, combination, and a numerical value range of the parameters are knowledge obtained from experimental results obtained by testing of various combinations by the inventors of the present invention.

The distance 2L between the axes of the adjacent straightening rolls 12 is a distance between the axial centers that are the rotation centers of the adjacent straightening rolls 12, and a half of the distance 2L is defined as an arrangement distance L of the straightening roll 12. The roll diameter 2r of the straightening roll 12 is twice a distance from the axial center of the straightening roll 12 to the bottom of the straightening groove G (groove bottom), and is a diameter of a circle formed by the bottom of the straightening groove G (groove bottom). Accordingly, a distance from the axial center of the straightening roll 12 to the bottom of the straightening groove G is a roll radius r.

In FIG. 5, the welding wire W is in contact with the groove bottom. However, for example, in a case where the curvature of the groove bottom is larger than the curvature of the outer periphery of the welding wire W, for example, the shape of the groove is a V-shape, the groove bottom and the welding wire W sometimes are not in contact with each other. In this case, the shortest distance from the axial center of the straightening roll 12 to the welding wire W inside the straightening groove G may be made to be the roll radius r. In this embodiment, a small vale of 20 mm or less, which is not used in the conventional straightening device, is employed as the roll diameter 2r, and the straightening roll having the roll diameter 2r of 20 mm or less is referred to as a small-diameter roll.

The wire diameter d of the welding wire W is the wire diameter (diameter) of the welding wire W. In this embodiment, the wire diameter d is assumed to be not less than 1.2 mm and not more than 1.6 mm.

As shown in FIG. 5, the engaging amount δ of the straightening rolls 12 is a value indicating an overlapped amount of the straightening rolls 12 when the groove bottoms of the two straightening rolls 12 facing with each other across the above straightening path T are viewed along the straightening path T. When the groove bottoms are viewed along the straightening path T, the groove bottoms of the two straightening rolls 12 are overlapped so as to enter toward the straightening path T, it can be said that the straightening rolls 12 are engaged with each other by this overlapped amount, and the overlapped amount of the straightening rolls 12 is referred to as the engaging amount δ of the straightening rolls 12.

At this time, when the groove bottoms of the facing two straightening rolls 12 are overlapped so as to enter toward the straightening path T, the engaging amount δ takes a positive value. When the groove bottoms are located on the same line which is almost parallel to the straightening path T, the engaging amount δ is 0 (zero). Furthermore, when the groove bottoms of the facing two straightening rolls 12 are not located on the same line which is almost parallel to the straightening path T, and are not overlapped as described above, the groove bottoms of these two straightening rolls 12 are separated from the same line and are located at an interval so as to be spaced from each other, and therefore the engaging amount δ takes a negative value by a distance corresponding to this interval.

From the above, as shown in FIG. 5, the pressing amount (δ+d) of the welding wire W is the sum of the engaging amount δ and the wire diameter d. The arrangement of the straightening rolls 12 in the first roll group 13a and the second roll group 13b is defined by use of the above four parameters.

First, the first roll group 13a and the second roll group 13b preferably include the straightening rolls 12 having such small diameters that a ratio of the roll radius r of each straightening roll 12 to the wire diameter d of the welding wire W satisfies a range shown in the following Expression (1).

$$4 \leq \frac{r}{d} \leq 9 \tag{1}$$

r: roll radius of straightening roll
d: wire diameter of welding wire.

Math 4 should be inserted. In the Expression, r denotes the roll radius of the straightening roll, and d denotes the wire diameter of the welding wire.

The first roll group 13a and the second roll group 13b more preferably include the straightening rolls 12 having such small diameters that the ratio of the roll radius r of each straightening roll 12 to the wire diameter d of the welding wire W satisfies a range shown in the following Expression (2).

$$4 \leq \frac{r}{d} \leq 6 \tag{2}$$

r: roll radius of straightening roll
d: wire diameter of welding wire.

When the straightening rolls 12 having such small diameters that satisfy a range shown in Expression (1) or Expression (2) are used, pressing force to the welding wire W by the straightening rolls 12 can be sufficiently largely ensured compared to a case where the conventional large diameter straightening rolls are used. Accordingly, also in a case where the engaging amounts δ of the straightening rolls 12 are reduced, it is possible to satisfactorily straighten the welding wire W. Additionally, when the small diameter straightening rolls 12 are used, it is possible to reduce contact distances (contact lengths) between the straightening grooves G of the straightening rolls 12 and the surface of the welding wire W. Consequently, it is possible to reduce a contact area, in which friction is generated between the straightening groove G of each straightening roll 12 and the surface of the welding wire W, and it is possible to suppress the amounts of plating, lubricant, and oil removed from the surface of the welding wire W.

Additionally, when the engaging amounts δ of the straightening rolls 12 can be reduced, the pressing amount (δ+d) of the welding wire W can be reduced, and therefore it is possible to suppress the curve of the welding wire W in the first roll group 13a and the second roll group 13b, to avoid damage to the welding wire W.

As to ratio of the engaging amount δ of the straightening rolls 12 to the wire diameter d of the welding wire W, the first roll group 13a and the second roll group 13b preferably satisfy a range shown in the following Expression (3), in addition to Expression (1) or Expression (2).

$$-1.3 \leq \frac{\delta}{d} \leq 0.3 \quad (3)$$

δ: engaging amount of straightening roll
d: wire diameter of welding wire.

When the engaging amount δ of the straightening rolls 12 is in a range that satisfies the Expression (3), the pressing amount (δ+d) of the welding wire W to the wire diameter d is held in a suitable range, and therefore it is possible to suppress force that acts on the welding wire W in the direction deviated from the straightening groove G. Accordingly, it is possible to avoid a problem that the welding wire W moves away to be twisted inside the straightening groove G. Furthermore, it is possible to satisfactorily and reliably straighten the welding wire W.

Furthermore, the first roll group 13*a* and the second roll group 13*b* preferably include the straightening rolls 12 arranged so that a ratio of the roll radius r to the arrangement interval L of the straightening rolls 12 satisfies a range shown in the following Expression (4).

$$0.5 \leq \frac{r}{L} \leq 0.7 \quad (4)$$

r: roll radius of straightening roll
L: arrangement interval between straightening rolls.

When the first roll group 13*a* and the second roll group 13*b* are configured to include the straightening rolls 12 arranged so that the arrangement interval L of the straightening rolls 12 satisfies Expression (4) in addition to Expression (1) to Expression (3), the first roll group 13*a* and the second roll group 13*b* can be extremely downsized while the arrangement of the respective straightening rolls 12 is held at suitable positions. Accordingly, it is possible to implement the extremely downsized straightening device 1 that suitably presses and straightens the welding wire W in the first roll group 13*a* and the second roll group 13*b* while suppressing the curve of the welding wire W.

Thus, the straightening device 1 according to this embodiment is described. The engaging amount δ of the straightening rolls 12 is extremely small, for example, not less than 1.00 mm, and therefore there is a case where the position of each straightening roll 12 needs to be adjusted in the unit of 0.01 mm in order to satisfactorily straighten the welding wire W. Not only is it difficult to adjust the positions of the straightening rollers 12 in the unit of 0.01 mm by hands of a person, but also the positions of the straightening rollers 12 may be deviated with use, and therefore it can be said that the straightening device 1 according to this embodiment, including the above non-adjustable type first roll group 13*a* and second roll group 13*b* is extremely useful.

The embodiment disclosed herein is to be considered to be illustrative and not restrictive in all respects. In particular, matters that are not explicitly disclosed in the current disclosed embodiment, for example, the operating conditions and measurement conditions, various parameters, dimensions, weight, and volume of the components, and the like, do not depart from a range in which those skilled in the art usually implement, and those skilled in the art employ the possible values to be easily assumed.

For example, the first roll group 13*a* is arranged with the first pedestal 14*a* interposed, and the second roll group 13*b* is arranged with the second pedestal 14*b* interposed. However, for example, in the first roll group 13*a*, even when the first pedestal 14*a* is not used, when the bolt holes are formed in the frame 10, and the lengths of the spacers S are sufficiently increased, the bolts B are directly screwed into the bolt holes of the frame 10, so that the first roll group 13*a* can be arranged at the above position with respect to the straightening path T.

Additionally, the wire diameter d of the welding wire W is set to not less than 1.2 mm and not more than 1.6 mm, but the wire diameter d is not limited to this numerical value range, and may be any diameter.

The invention claimed is:

1. A straightening device for a welding wire, comprising:
two sets of roll groups, each including a plurality of straightening rolls configured to allow the welding wire to pass through the two sets of roll groups and to straighten bends of the welding wire,
the plurality of straightening rolls of the two sets of roll groups being arranged at a predetermined arrangement interval along a straightening path along which the welding wire passes,
the plurality of straightening rolls of the first set of roll groups being arranged so that a first portion of said plurality is disposed on a first side of the straightening path and a second portion of said plurality is disposed on a second side of the straightening path, an axial center of two adjacent straightening rolls of said first portion being separated by a distance that is twice the predetermined arrangement interval, and an axial center of two adjacent straightening rolls of said second portion being separated by said distance,
the plurality of straightening rolls of the second set of roll groups being arranged so that a first portion of said plurality is disposed on a third side of the straightening path and a second portion of said plurality is disposed on a fourth side of the straightening path, an axial center of two adjacent straightening rolls of said first portion being separated by said distance and an axial center of two adjacent straightening rolls of said second portion being separated by said distance,
the first side, the second side, the third side, and the fourth side being different,
the plurality of straightening rolls of the first set of roll groups and the plurality of straightening rolls of the second set of roll groups engage the welding wire according to:

$$-1.3 \leq \frac{\delta}{d} \leq 0.3,$$

where
δ is an amount of overlap between straightening rolls on the first side and the second side, and between straightening rolls on the third side and the fourth side, when viewed along a direction of the straightening path, and
d is a diameter of the welding wire.

2. The straightening device according to claim 1, wherein each straightening roll of the plurality of straightening rolls of the two sets of roll groups satisfies the following range of a ratio of a roll diameter of said each straightening roll to the welding wire diameter:

$$4 \leq \frac{r}{d} \leq 9$$

where
r is a roll radius of said each straightening roll, and
d is the wire diameter of the welding wire.

3. The straightening device for welding wire according to claim 2, wherein each straightening roll of the plurality of straightening rolls of the two sets of roll groups satisfies the following ratio of the roll diameter to the predetermined arrangement interval:

$$0.5 \leq \frac{r}{L} \leq 0.7$$

where
r is a roll radius of said each straightening roll, and
L is the arrangement interval between said each straightening roll.

4. The straightening device according to claim 1, wherein each straightening roll of the plurality of straightening rolls of the two sets of roll groups satisfies the following range of a ratio of a roll diameter of said each straightening roll to the welding wire diameter:

$$4 \leq \frac{r}{d} \leq 6$$

where
r is as roll radius of said each straightening roll, and
d is the wire diameter of the welding wire.

5. The straightening device according to claim 1, wherein the straightening rolls of the plurality of straightening rolls of the first set of roll groups and of the plurality of straightening rolls of the second set of roll groups each include five straightening rolls.

6. The straightening device according to claim 1, wherein an arrangement position of each of the straightening rolls of the plurality of straightening rolls of the first set of roll groups and of the plurality of straightening rolls of the second set of roll groups is nonadjustable.

7. The straightening device accord to claim 1, wherein the roll radius of said each straightening roll is less than or equal to 10 mm.

8. The straightening device according to claim 1, wherein each of the straightening rolls of the plurality of straightening rolls of the first set of roll groups and of the plurality of straightening rolls of the second set of roll groups includes an inner ring, an outer ring, and rolling elements arranged between the inner ring and the outer ring.

9. The straightening device according to claim 8, wherein an entire periphery of the outer ring is formed with a straightening groove.

* * * * *